US006761748B2

(12) United States Patent
Schenk et al.

(10) Patent No.: US 6,761,748 B2
(45) Date of Patent: Jul. 13, 2004

(54) AIR FILTRATION SYSTEM

(75) Inventors: Herbert Schenk, Benningen (DE); Thomas Reinhold, Zaragoza (ES); Manuel Aisa, Zaragoza (ES)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/318,387

(22) Filed: Dec. 13, 2002

(65) Prior Publication Data

US 2003/0126842 A1 Jul. 10, 2003

Related U.S. Application Data

(63) Continuation of application No. PCT/EP01/03298, filed on Mar. 23, 2001.

(30) Foreign Application Priority Data

Jun. 16, 2000 (DE) ........................................ 100 28 956

(51) Int. Cl.[7] .......................... B01D 53/04; F02M 25/08

(52) U.S. Cl. ................................ 55/385.3; 55/DIG. 28; 55/DIG. 30; 96/133; 96/147; 96/380; 96/383; 123/198 E; 123/519; 180/68.3; 248/311.2

(58) Field of Search ........................ 55/385.3, DIG. 28, 55/DIG. 30; 96/133, 147, 380, 383; 123/198 E, 519; 180/68.3; 248/311.2

(56) References Cited

U.S. PATENT DOCUMENTS

| | | | | | |
|---|---|---|---|---|---|
| 4,514,201 | A | * | 4/1985 | Brown | 55/385.3 |
| 5,089,938 | A | * | 2/1992 | White et al. | 55/385.3 |
| 5,400,753 | A | * | 3/1995 | Andress et al. | 122/198 E |
| 5,494,497 | A | * | 2/1996 | Lee | 55/335.3 |
| 5,609,658 | A | | 3/1997 | Takemura et al. | |
| 6,395,072 | B2 | * | 5/2002 | Miura et al. | 55/385.3 |
| 6,409,784 | B1 | * | 6/2002 | Wehr | 55/385.3 |
| 6,551,389 | B2 | * | 4/2003 | Spannbauer et al. | 55/385.3 |
| 6,564,768 | B2 | * | 5/2003 | Bauer et al. | 55/385.3 |

FOREIGN PATENT DOCUMENTS

| | | |
|---|---|---|
| DE | 3429633 | 2/1986 |
| DE | 4403219 | 8/1995 |
| DE | 19650806 | 6/1998 |
| DE | 19802074 | 7/1999 |
| EP | 0789141 | 8/1997 |
| EP | 0930430 | 7/1999 |

OTHER PUBLICATIONS

International Search Report, Aug. 16, 2001.

* cited by examiner

*Primary Examiner*—Minh-Chau T. Pham
(74) *Attorney, Agent, or Firm*—Crowell & Moring LLP

(57) ABSTRACT

An air filtration system for purifying an air stream, such as the intake air for an internal combustion engine, including a system plate (10), an unfiltered air zone (13), a filter housing (12) containing a filter element (16), and a filtered air zone (19). The filter element hermetically seals and separates the unfiltered air zone (13) from the filtered air zone. The unfiltered air zone (13) is configured by a first half shell (11), which is connected to the system plate (10) in a fixed, hermetically sealed manner. The filter housing (12) is also connected to the system plate in a fixed and sealed manner. The permanent, air-tight connection of the first half shell to the system plate allows the air filtration system to be manufactured in a simpler, more rapid and more cost effective manner by obviating the need for seals and connecting elements, as well as the need to assemble such parts.

14 Claims, 3 Drawing Sheets

AIR FILTRATION SYSTEM

CROSS REFERENCE TO RELATED APPLICATIONS

This application is a continuation of international patent application no. PCT/EP01/03298, filed Mar. 23, 2001, designating the United States of America and published in German as WO 01/96729, the entire disclosure of which is incorporated herein by reference. Priority is claimed based on Federal Republic of Germany patent application no. DE 100 28 956.8, filed Jun. 16, 2000.

BACKGROUND OF THE INVENTION

The present invention relates to an air filtration system comprising a system plate, a filter chamber having an air intake and an air outlet, and a filter element sealingly arranged in the filter chamber between the air intake and the air outlet so that air entering through the intake must pass through the filter element to reach the air outlet, in which the filter element divides an unfiltered air zone from a filtered air zone.

An intake module for an internal combustion engine, which comprises a plurality of integrated components, such as an unfiltered air intake opening, an unfiltered air intake passage, an air filter, a filtered air passage, and a filtered air connecting piece, is known from German patent application no. DE 198 02 074. The intake module is dimensioned in such a way that it completely covers the internal combustion engine. For this purpose, a flat plate is provided, which has shaped connection contours on its bottom side. A bottom part is attached to the bottom side of the plate, which is set on the connection contours and connected to the plate using multiple screws. To provide a sealed connection between the plate and the bottom part, a seal is inserted between the plate and the bottom part. However, screwing the top part onto the bottom part, and the insertion of the seal, results in high costs for materials and for assembly. Furthermore, the plate is a very complicated component, which is therefore difficult to manufacture due to the shaped connection contours.

SUMMARY OF THE INVENTION

The object of the present invention is therefore to provide an improved air filtration system for an internal combustion engine.

Another object of the invention is to provide an air filtration system which can be produced easily with low expenditures for materials and for assembly.

These and other objects are achieved in accordance with the present invention by providing an air filtration system comprising a system plate, a filter chamber having an air intake and an air outlet, and a filter element sealingly arranged in the filter chamber between the air intake and the air outlet so that air entering through the intake must pass through the filter element to reach the air outlet, the filter element dividing an unfiltered air zone from a filtered air zone; the system plate having upper and lower sides and at least partially covering a device; wherein the unfiltered air zone is formed by a first half shell permanently and sealingly attached to the system plate; and the filter chamber is formed by a filter housing attached to the system plate.

The air filtration system according to the present invention comprises a system plate having a top side and a bottom side, which at least partially, and preferably completely, covers a device such as an internal combustion engine.

Furthermore, the air filtration system includes an unfiltered air intake and an unfiltered air zone, which discharges into a filter chamber. Positioned in the filter chamber is a filter element, which sealingly separates the unfiltered air zone from a filtered air zone having a filtered air outlet. The filter element has a peripheral seal and may be formed, for example, by a filter paper, preferably folded in a zigzag shape, or by a nonwoven filter web. In certain embodiments, the top side of the system plate may be designed as a visually appealing cover plate, and the bottom side of the system plate as function-oriented.

The unfiltered air intake discharges into the unfiltered air zone, which is formed by a first half shell in combination with the system plate. The first half shell is connected in a sealed manner to the bottom side of the system plate, thereby defining the unfiltered air zone. In some regions, particularly in the region of the unfiltered air intake, the first half shell may form a closed channel, so that the unfiltered air intake may, for example, be raised above the system plate. The connection of the first half shell to the bottom side of the system plate is a permanent bond which may be produced thermally or chemically, for example, by bonding with an adhesive. In this case, the use of an additional seal is not necessary, since the bond itself forms a seal. The sealing is performed, for example, by the adhesive applied. Mechanical attachment devices and seals thus may be omitted as a result of the permanent bonding of the system plate to the first half shell.

The filter chamber is formed by a filter housing which is attached to the system plate. In this case, for example, the filter housing may be a closed filter housing having openings which allow unfiltered air to enter the filter chamber and filtered air to exit. One side of the housing is then rigidly connected to the system plate. The opening in the filter housing for admitting the unfiltered air may be connected either detachably or permanently to the first half shell, which encloses the unfiltered air zone.

The filtered air zone is connected on the downstream side of the filter element to the filter chamber. It may be connected, for example, exclusively to the filter housing and not have any contact to the system plate. In this case, the filtered air zone may be designed, for example, as a connecting piece, having any desired cross-section, which extends directly from the filter housing.

According to a further embodiment of the present invention, the filtered air zone is formed by a second half shell in combination with the system plate. In this case, the second half shell may be attached to the filter housing or constructed in one piece therewith and may adjoin the opening for the filtered air in the filter housing or correspond to the downstream filter chamber through exclusive contact to the system plate, so that the filtered air flows through an opening in the system plate to the filtered air outlet. In this embodiment, the opening for the filtered air is positioned on the filter housing in such a way that it is located on the side connected to the system plate and covers the passage in the system plate. The second half shell may be positioned on the top side of the system plate, so that the filtered air may be conducted along the top side of the system plate. Through this design, diverse types of air guide variants are possible, which may be constructed in a very tight space.

If the second half shell adjoins both the filter housing and the bottom side of the system plate, the opening for the filtered air in the filter housing must be positioned in such a way that it discharges into the second half shell. Various types of air guidance possibilities may thus be constructed, in which both the unfiltered air inlet and the filtered air outlet are arranged on the bottom side of the system plate.

It is advantageous to permanently affix the filter housing to the system plate. For this purpose, thermal or chemical bonding methods may be used for the permanent attachment between the filter housing and the system plate. The bond between the system plate and the filter housing may be produced using the same bonding method as the bond between the first half shell and the system plate. Therefore, the first half shell and the filter housing may be bonded to the system plate in one work step, which saves time during assembly of the air filtration system.

In one specific embodiment of the present invention, the permanent bond is a weld seam. This weld seam may be produced, for example, using vibration welding methods or ultrasound welding methods. During such welding of the components to one another, material is melted, which forms a weld seam. Tolerances may thus be compensated, so that a sealed joint may be produced rapidly and reliably at a low assembly cost.

According to a further embodiment, the filter housing is formed by a housing frame, having a housing cover, and the system plate. The housing frame is welded to the bottom side of the system plate. Consequently, the bottom side of the system plate forms a part of the filter housing. The housing cover is sealingly attached in an air-tight manner to the housing frame, so that no air may escape from the filter housing or enter the filter housing. Sealing means, in particular rubber seals, may be provided for the sealed joint between the housing frame and the housing cover. Furthermore, the housing cover may be removably affixed to the filter frame, so that the filter element disposed in the filter housing may be replaced as necessary. In advantageous embodiments, the filter housing may be snapped removably onto the housing frame, so that the housing cover is rapidly and easily removable from the housing frame.

It is advantageous to dispose ribs on the system plate. In order to optimize the connection between the system plate and the first half shell, ribs, which may in particular be designed as narrow, flat ribs, may be provided on the bottom side of the system plate. The ribs may be straight or curved, and in certain embodiments they may follow the contour of the components connected to the system plate. As a result of the formation of the ribs, the system plate is provided with additional material, which may be melted during welding, for example, or which offers an additional contact surface during adhesive bonding. In addition, these ribs also increase the intrinsic stability of the system plate.

According to one advantageous embodiment of the present invention, the unfiltered air zone has an acoustically effective, curved air guide. In this case, the first half shell, which encloses the unfiltered air zone, is constructed in such a way that its course forms a curved air guide having desired acoustic effects. Multiple curved air guides, which positively influence the noise generated by the air flowing through the system, may also be provided in order to produce either a reduction in noise or a change in the emitted sound frequency which is generated. An omega curve represents an especially advantageous embodiment of the curved air guide.

In a further embodiment of the present invention, the unfiltered air zone has a second unfiltered air inlet, which may be opened using a flap. In this embodiment, the first half shell may be constructed in such a way that it also forms the second unfiltered air inlet. In this case, the flap is positioned in the first half shell in such a way that it may close off either the first unfiltered air inlet or the second unfiltered air inlet as a result of appropriate switch settings. In addition, a switch setting is conceivable in which the flap at least partially enables or opens both unfiltered air inlets. The flap is preferably positioned in the region where the unfiltered air zone which extends from the first unfiltered air inlet meets the unfiltered air zone which extends from the second unfiltered air inlet. In other embodiments, two separate flaps may also be provided, a first flap for closing off the first unfiltered air inlet and a second flap being used to close the second unfiltered air inlet. The two flaps advantageously have a connection which controls the flaps in mutual dependence on one another. By using a second unfiltered air inlet which may be opened, air may be drawn in from different surroundings. This is particularly advantageous in motor vehicles, since if the first unfiltered air inlet comes into contact with water or snow, for example, the flap may seal this unfiltered air inlet and open the second unfiltered air inlet, so that, for example, warmed air may be drawn in from the motor compartment, and the internal combustion engine may operate without danger.

A further embodiment provides attachment points for mounting the air filtration system on an adjacent internal combustion engine. The attachment points may be positioned on the system plate or on the components connected to the system plate. The attachment points may be formed directly on the system plate or on the components, or they may be constructed as separate components, particularly components made of rubber. Multiple attachment points are preferably provided distributed over the air filtration system. If the attachment points are constructed as separate components, in addition to the attachment function, they may also serve as oscillation dampers or as spacers between the internal combustion engine and the air filtration system, so that the air filtration system is not subjected to excessive mechanical or thermal loads.

In one advantageous embodiment of the present invention, the half shells and the system plate are made of a thermoplastic synthetic resin material. Therefore, the individual components of the air filtration systems may be produced easily and rapidly using injection molding, and the components may be assembled, for example, using friction welding. In addition, the air filtration system may be easily disposed of or recycled after use.

These and other features of preferred embodiments of the invention, in addition to being set forth in the claims, are also disclosed in the specification and/or the drawings, and the individual features each may be constructed in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
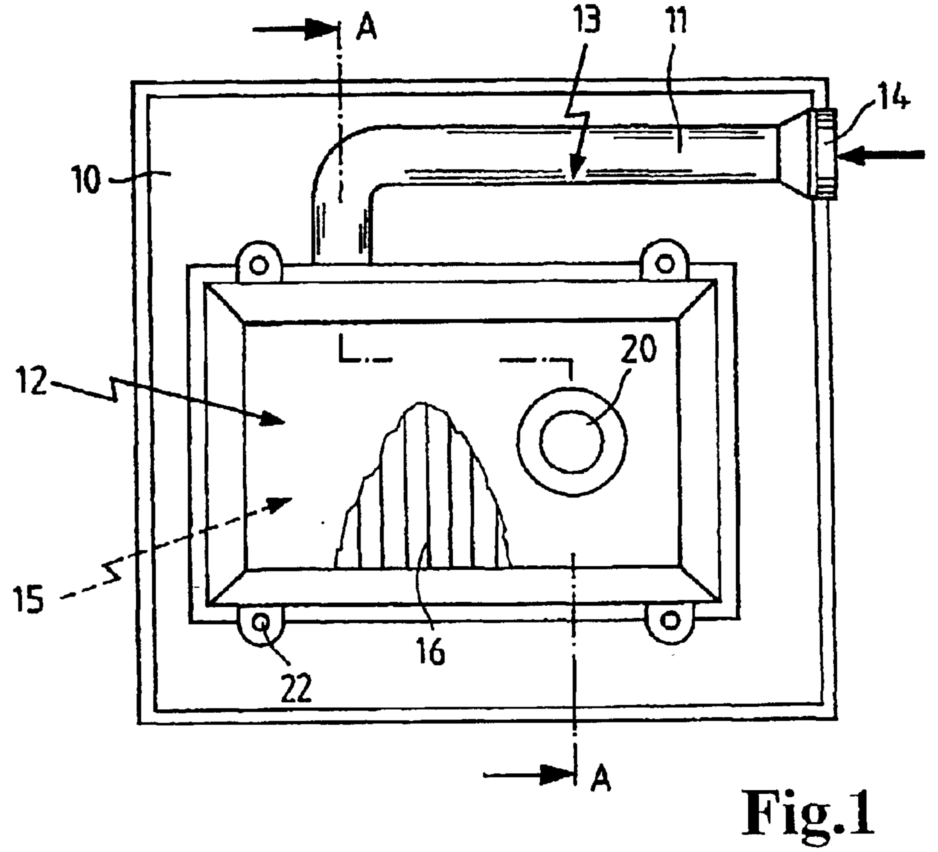
FIG. 1 shows an air filtration system according to the invention.

An air filtration system is shown in a top view in FIG. 1. The air filtration system comprises a system plate 10, which is permanently affixed to a first half shell 11 and a filter housing 12. First half shell 11 encloses an unfiltered air zone 13 in combination with system plate 10. Unfiltered air zone 13 has an unfiltered air intake 14 and is connected to filter housing 12.

Figure 2:
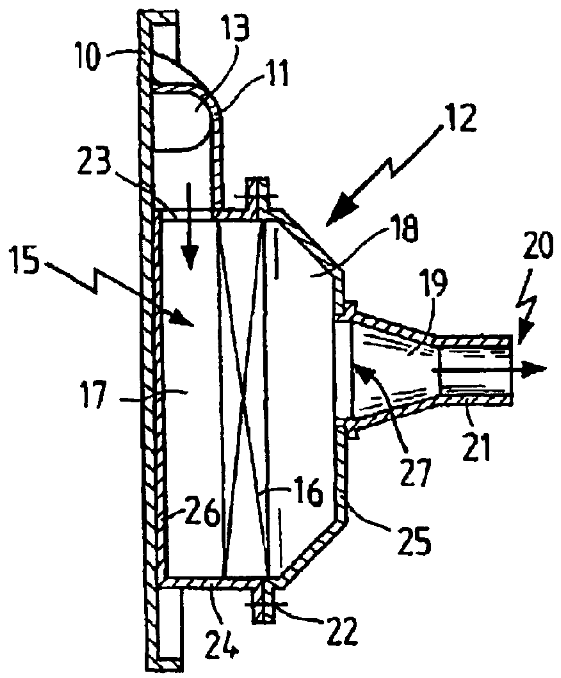
FIG. 2 shows a sectional view of the air filtration system taken along section line A—A of FIG. 1.

As shown in FIG. 2, filter housing 12 encloses a filter chamber 15, which is divided into an unfiltered air zone 17 and a filtered air zone 18 by a filter element 16. Filter element 16 is inserted into filter housing 12 to form a seal. In this illustrative embodiment, a filtered air zone 19 having a filtered air outlet 20 adjoins filtered air zone 18. Filtered air zone 19 is formed by a connection piece 21, which is rigidly connected to filter housing 12. In order that filter element 16 may be replaced as necessary, filter housing 12 is constructed in two pieces, the two housing parts being releasably connected using screws 22.

The air filtration system draws air from its surroundings. This air flows through unfiltered air intake 14 into unfiltered air zone 13. The air flows into unfiltered air zone 17 (shown in FIG. 2) of filter chamber 15 through a first opening 23 (shown in FIG. 2) in filter housing 12, which is completely covered by unfiltered air zone 13. In order for the air to reach filtered air zone 18 (shown in FIG. 2), it must flow through filter element 16, where it is filtered. From filtered air zone 18, the air flows to filtered air zone 19 and exits the air filtration system through filtered air outlet 20.

FIG. 2 is a sectional view of the air filtration system of FIG. 1 taken along section line A—A. The components corresponding to FIG. 1 are identified by the same reference numbers. First half shell 11 is sealingly welded in an air-tight manner to system plate 10 to form unfiltered air zone 13. Filter housing 12 comprises a bottom part 24 and a housing cover 25. Housing cover 25 is removably attached to bottom part 24 using screws 22.

Bottom part 24 has a housing floor 26, which is permanently affixed to system plate 10. Furthermore, bottom part 24 encloses unfiltered air zone 17. A first opening 23, which is enclosed by first half shell 11 with system plate 10, is provided in bottom part 24. The air may flow from unfiltered air zone 13 into unfiltered air zone 17 through this first opening 23.

Filter housing 12 also has a second opening 27, which is positioned in housing cover 25. The filtered air from filtered air zone 18, which is formed by housing cover 25, may then flow through this second opening 27 into filtered air zone 19, formed by connection piece 21. Filter element 16 has a rectangular configuration and is positioned in the filter housing parallel to system plate 10 such that it forms a seal which separates unfiltered air zone 17 from filtered air zone 18.

Figure 3:
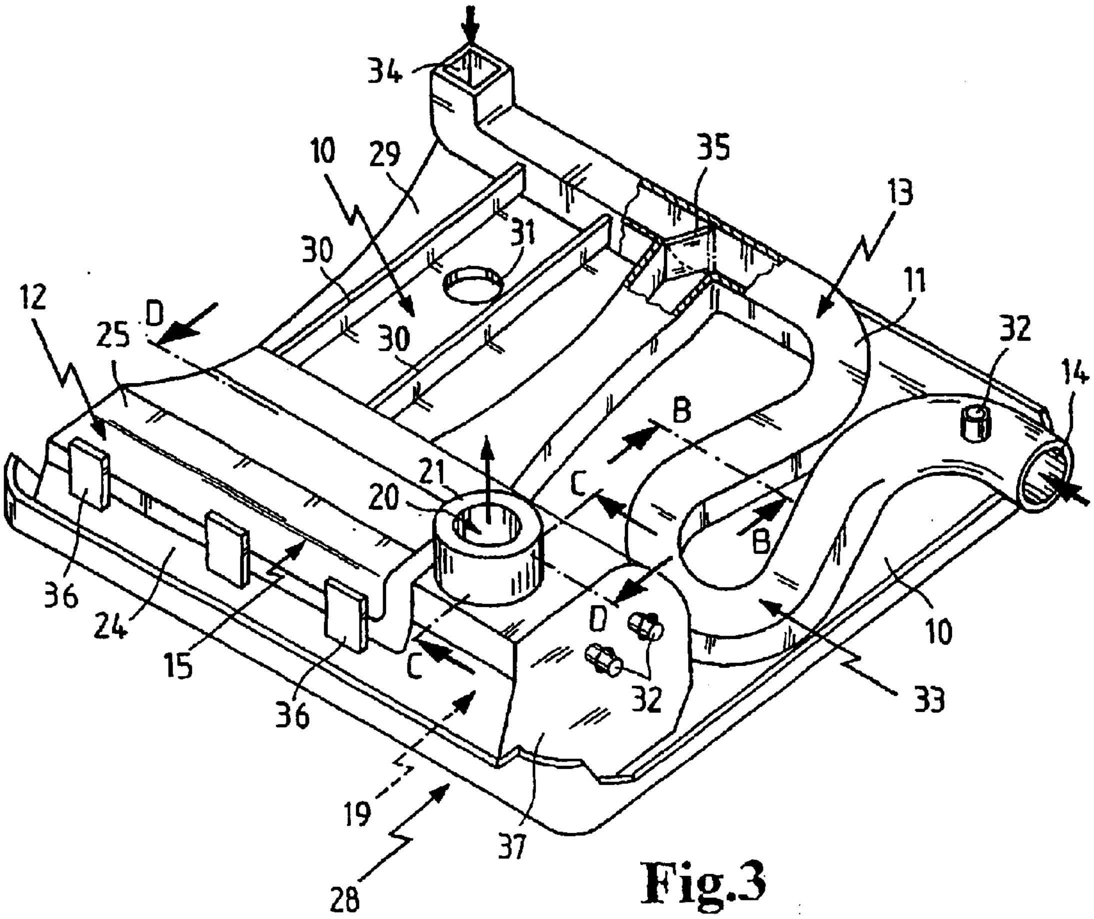
FIG. 3 shows another air filtration system embodiment according to the invention.

A variant air filtration system embodiment is illustrated in FIG. 3. The air filtration system comprises a system plate 10 made of synthetic resin material, which has a visually appealing top side 28 and a function-oriented bottom side 29. For clarity of illustration, in the following figures system plate 10 is shown inverted so that the "top" side in normal use is toward the bottom of the page, and the "bottom" side in normal use is shown on top. System plate 10 is slightly curved and has angled edges. Top side 28 of the system plate may be constructed, for example, in the form of a polished or textured surface to which symbols, such as a company logo, may be applied. Bottom side 29 has ribs 30, which may be used both for stability and to assist attachment of components arranged on system plate 10. Ribs 30 may run in a straight line as shown, or in other embodiments they may, for example, follow the contour of first half shell 11 or filter housing 12. Furthermore, system plate 10 has an opening 31, through which, for example, attachment components may project or maintenance work may be performed on an internal combustion engine positioned beneath it.

A first half shell 11 is affixed in an air-tight manner to bottom side 29 of system plate 10 using the vibration welding method so that an unfiltered air zone 13 is formed. First half shell 11 completely encloses an unfiltered air intake 14, so that unfiltered air intake 14 may also be positioned at a distance from system plate 10. Unfiltered air zone 13 has an omega curve 33 in one section, through which the air guidance is influenced and an acoustic effect is achieved. An attachment nipple 32 is provided on unfiltered air zone 13, to which, for example, a crankcase ventilation line (not shown) may be attached. In this illustrative embodiment, first half shell 11 is configured in such a way that it includes a second unfiltered air intake 34. Second unfiltered air intake 34 also discharges into unfiltered air zone 13. A flap 35 is provided to block or unblock unfiltered air intakes 14 and/or 34. For this purpose, flap 35 is positioned in a T-shaped region of unfiltered air zone 13. In a first end position, the flap closes off second unfiltered air intake 34 from a subsequent filter housing 12. In a second end position (shown in broken lines), flap 35 blocks first unfiltered air intake 14 from subsequent filter housing 12. Therefore, flap 35 may be used to control aspiration of air from different regions.

Unfiltered air zone 13 discharges into a filter chamber 15 formed by filter housing 12. A filter element 16 (not shown) is positioned in filter chamber 15. Filter housing 12 comprises a housing cover 25 and a bottom part 24. Housing cover 25 is secured to bottom part 24 by snap connections 36. Unfiltered air zone 13 may be connected to filter housing 12 by a detachable connection to housing cover 25 or by a permanent connection to bottom part 24. Bottom part 24 is sealingly welded in an air-tight manner to system plate 10. A second half shell 37, which encloses a filtered air zone 19, adjoins filter chamber 15 on the filtered air side. Attachments nipples 32 are provided on second half shell 37, through which, for example, crankcase ventilation gases may be introduced into the air filtration system. Second half shell 37 includes a connecting piece 21, which is constructed as a separate component. Connecting piece 21 surrounds a filtered air outlet 20, which does not touch system plate 10. In this illustrative embodiment, bottom part 24 of filter housing 12 is constructed in one piece with the second half shell 37, so that the number of parts is reduced.

Figure 4:
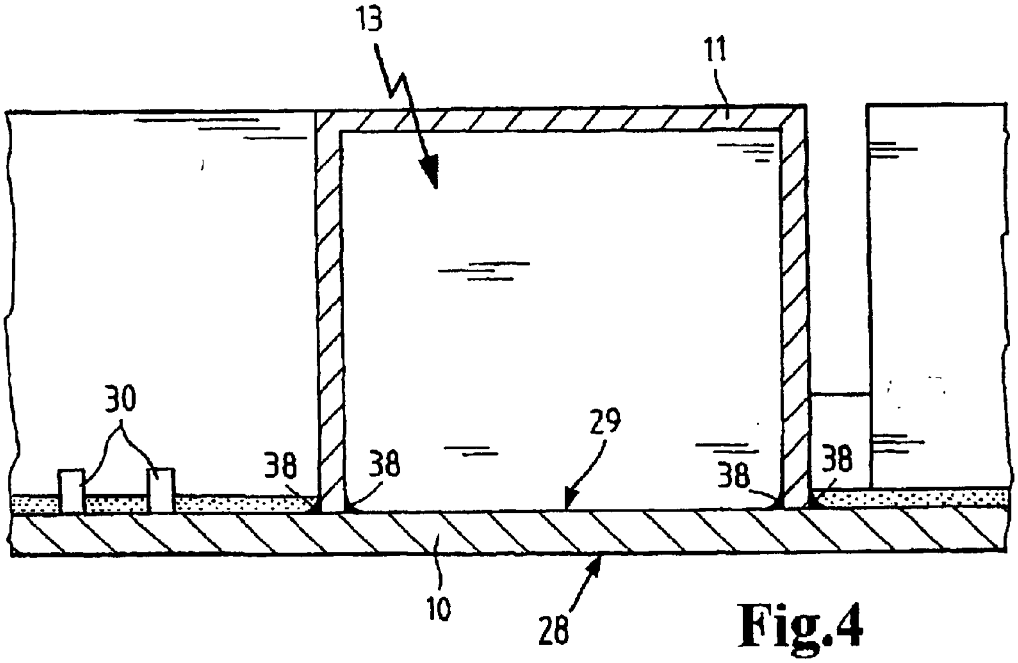
FIG. 4 is a sectional view of the air filtration system of FIG. 3 taken along section line B—B.

FIG. 4 shows a sectional view of the air filtration system of FIG. 3 taken along section line B—B. The components corresponding to FIG. 3 are identified by the same reference numbers. First half shell 11 is sealingly welded in an air-tight manner to system plate 10, so that unfiltered air zone 13 is enclosed. Weld seams 38, which join system plate 10 to first half shell 11, may be produced, for example, through friction welding or ultrasound welding. In order that, for example, first half shell 11 may be positioned exactly on system plate 10, bottom side 29 of system plate 10 may have depressions (not shown), which allow first half shell 11, for example, to be plugged in. In this way, the welding process may be simplified.

Figure 5:
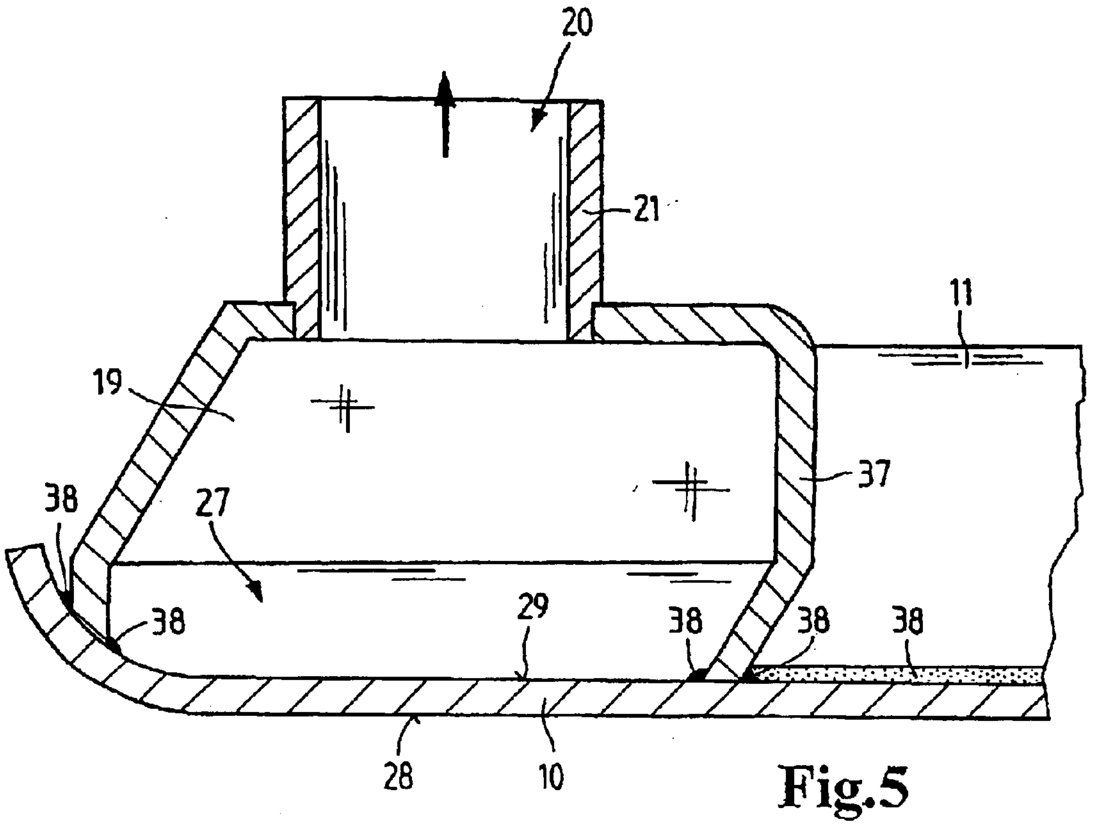
FIG. 5 is another sectional view of the air filtration system of FIG. 3 taken along section line C—C.

FIG. 5 shows a sectional view of the air filtration system of FIGS. 3 and 4 taken along section line C—C. The components corresponding to FIG. 3 are identified by the same reference numbers. Second half shell 37 is sealingly welded in an air-tight manner to system plate 10, so that filtered air zone 19 is formed. From filtered air zone 19, the filtered air enters connecting piece 21, which is sealingly bonded to second half shell 37. In other embodiments, connecting piece 21 may also be constructed in one piece with second half shell 37. The filtered air may exit the air filtration system through filtered air outlet 20 and, for example, enter the intake manifold of an internal combustion engine (not shown).

Figure 6:
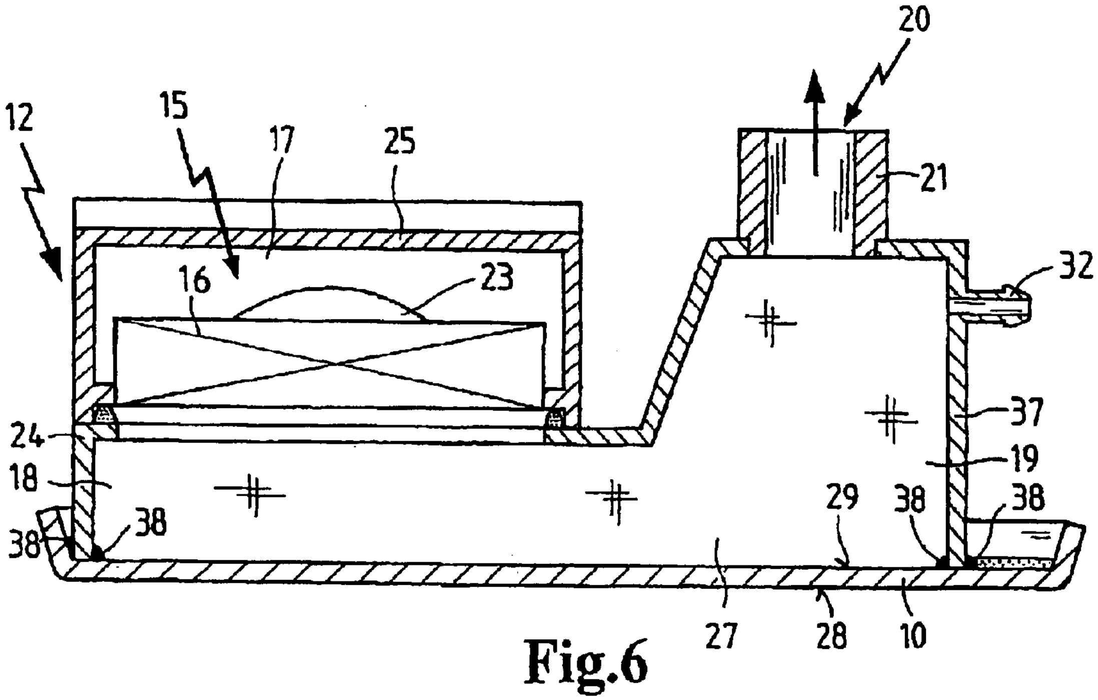
FIG. 6 is yet another sectional view of the system of FIG. 3 taken along section line D—D.

A sectional view of the air filtration system taken along section line D—D of FIG. 3 is illustrated in FIG. 6. The components corresponding to FIGS. 3 through 5 are identified by the same reference numbers. A filter element 16, which is inserted between housing cover 25 and bottom part 24 to form a seal, is installed in filter chamber 15. Bottom part 24 is designed as a frame and has no floor. Therefore, filtered air zone 18 has direct contact to system plate 10. Housing cover 25 has a first opening 23, through which the air to be filtered may enter unfiltered air zone 17. First opening 23 is enclosed by first half shell 11 outside of filter housing 12.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An air filtration system comprising a system plate, a filter chamber having an air intake and an air outlet, and a filter element sealingly arranged in said filter chamber between said air intake and said air outlet so that air entering through said intake must pass through the filter element to reach the air outlet, said filter element dividing an unfiltered air zone from a filtered air zone; said system plate having upper and lower sides and at least partially covering a device; wherein said unfiltered air zone is formed by a first half shell permanently and sealingly attached to said system plate; and said filter chamber is formed by a filter housing attached to said system plate.

2. An air filtration system according to claim 1, wherein said air outlet communicates with an intake manifold of an internal combustion engine.

3. An air filtration system according to claim 1, wherein said upper side of said system plate is a visually appealing cover member, and the lower side of said system plate is function-oriented.

4. An air filtration system according to claim 1, wherein the filtered air zone is formed by a second half shell in combination with the system plate.

5. An air filtration system according to claim 1, wherein the filter housing is permanently bonded to the system plate.

6. An air filtration system according to claim 5, wherein the filter housing is sealingly welded to the system plate.

7. An air filtration system according to claim 1, wherein said first half shell is sealingly welded to the system plate.

8. An air filtration system according to claim 1, wherein the filter housing comprises a housing frame having a housing cover; said housing frame being welded to the system plate.

9. An air filtration system according to claim 1, wherein ribs are provided on the system plate.

10. An air filtration system according to claim 1, wherein the unfiltered air zone is provided with an effective acoustic noise damping curved air guide.

11. An air filtration system according to claim 1, further comprising a second air intake leading into the unfiltered air zone, and a valve flap for selectively opening and closing said second air intake.

12. Au air filtration system according to claim 1, further comprising attachment means for mounting the air filtration system to an internal combustion engine.

13. An air filtration system according to claim 1, wherein the half shells and the system plate are made of thermoplastic synthetic resin material.

14. An air filtration system according to claim 1, wherein the first half shell and the filter housing are attached to the same side of the system plate.

* * * * *